Oct. 4, 1966  W. H. REED III  3,276,251
TEST UNIT FREE-FLIGHT SUSPENSION SYSTEM
Filed Sept. 16, 1963  3 Sheets-Sheet 1

*INVENTOR*
WILMER H. REED, III

BY

*ATTORNEYS*

Oct. 4, 1966   W. H. REED III   3,276,251
TEST UNIT FREE-FLIGHT SUSPENSION SYSTEM
Filed Sept. 16, 1963   3 Sheets-Sheet 2

INVENTOR
WILMER H. REED, III

BY

ATTORNEYS

Oct. 4, 1966   W. H. REED III   3,276,251
TEST UNIT FREE-FLIGHT SUSPENSION SYSTEM
Filed Sept. 16, 1963   3 Sheets-Sheet 3

INVENTOR
WILMER H. REED, III

BY
ATTORNEYS

United States Patent Office 3,276,251
Patented Oct. 4, 1966

3,276,251
TEST UNIT FREE-FLIGHT SUSPENSION SYSTEM
Wilmer H. Reed III, Hampton, Va., assignor to the United States of America as represented by the Administrator of the National Aeronautics and Space Administration
Filed Sept. 16, 1963, Ser. No. 309,354
20 Claims. (Cl. 73—147)

The invention described herein may be manufactured and used by or for the Government of the United States of America for governmental purposes without the payment of any royalties thereon or therefor.

This invention relates to a free-flight suspension system, and more particularly to a free-flight suspension system wherein the test model has up to six degrees of freedom of rigid-body motion.

Wind tunnel investigations of the dynamic characteristics of aircraft and/or spacecraft frequently require that the model under study be flown in the test section of the wind tunnel. Proper simulation of the free-flight motions involving pitch, yaw and roll rotations as well as horizontal and vertical translations may be mandatory in such wind tunnel tests as flutter, gust response, or dynamic stability of complete configurations. Previous attempts to simulate free-flight conditions in a wind tunnel have met with varying degrees of success; however, until the present invention the apparatus for free-flight simulation has involved complicated structure limited in amplitude motion and to few degrees of freedom of motion.

One method utilized for simulating free-flight is that of attaching a model to the end of a tow line. Although such an arrangement is to a degree successful, it has many disadvantages one of which is the requirement of complicated fast-response autopilot structure to control the model. The model in the test section often gets out of control when attached to a tow line, the consequences being that the model will smash into the walls of the test section causing costly damage. Models are expensive to construct and are normally limited in quantity. The repair of a model is costly and results in loss of man hours and delay in experimenting. Another simulation technique is to mount the model so that it is free to vertically translate along a rod. In this system angular freedoms in pitch, paw, and roll are permitted to a very limited extent. It tends to be cumbersome and is suitable only for low speed tests. At transonic speeds and above, shock waves generated by the rod support as well as deflections of the rod under high drag loads make the system unsatisfactory. A vertical wire which is connected at either end to the model and engaged with pulleys located outside the tunnel to form a continuous loop has also been used to provide free-flight simulation. Tests in the transonic dynamic tunnel using this apparatus has shown that serious lateral instability develops due to the mount restraints. An arrangement whereby four flexible rods pass vertically through the fuselage of the model near its center of gravity, the rod ends being attached to blocks which slide on a vertical rod supported by the tunnel walls, has also been utilized. This type of suspension is satisfactory only for low speed tests. A model has been gimbaled to a fast response servo-control carriage designed to sense and follow translation motions of the model. This arrangement is undesirable due to its complexity and the involved automatic control systems necessary to make the models flyable. Also, this arrangement introduces excessive aerodynamic interference at transonic speeds.

The instant invention overcomes the various difficulties inherent in the prior art arrangements. By mounting pulleys in the model according to principles of the invention and suspending the model on wires and cables, as well as placing a spring on at least one of the wires or cables, a free-flight suspension system is provided which is extremely simple in construction, does not cause excessive aerodynamic interference, and does not require a complex automatic control system.

It is, therefore, an object of this invention to provide a free-flight suspension system which utilizes a minimum number of component parts which are economical to construct and assemble.

A further object of this invention is to provide a free-flight suspension system which will provide up to six degrees of freedom of rigid-body motion of the model.

Yet another object of this invention is to provide a free-flight suspension system which will restrain the model such that collision with the test section is virtually impossible.

Another object of this invention is to provide a free-flight suspension system wherein the model is placed under sufficient tension to stabilize the system; however, the restraint is small enough as to keep the natural frequencies of the mount well below the rigid body frequencies of the model in free-flight.

Still another object of this invention is to provide a free-flight suspension system having a mass which is in general negligable compared with the mass of the model.

Yet another object of this invention is to provide a free-flight suspension system which permits tests at transonic and supersonic velocities.

A further object of this invention is to provide a free-flight suspension system supplying a steady force essentially independent of motions of the model whereby gravity forces may be scaled.

Yet another object of this invention is to provide a free-flight suspension system which allows the possibility of large amplitude motion.

A further object of this invention is to provide a free-flight suspension system which is readily adaptable to a broad range of model configurations.

Another object of this invention is to provide a free-flight suspension system with which maneuver loads and/or dynamic stability derivatives on complete aeroelastic models can be measured in a wind tunnel.

These and other objects and advantages of the invention will become more apparent upon reading the specification in conjunction with the accompanying drawings.

Basically, this invention relates to a system for suspending a model in a wind tunnel test section to simulate free-flight of the model. The system includes an arrangement whereby pulleys are mounted in the test model. The pulleys are arranged such that a cable is entrained over certain of the pulleys and fixed to the top and bottom of the test section. Another cable is entrained over certain of the other pulleys connected to the respective sidewalls of the test section. Means for tensioning a spring in at least one of the cables and in certain instances both of the cables is provided to stabilize the system. The model has conventional control surfaces which are operated remotely. Remote control is provided for by a flexible electrical conduit connected to the model and supported by a sting of conventional design located in the test chamber.

Figure 1:
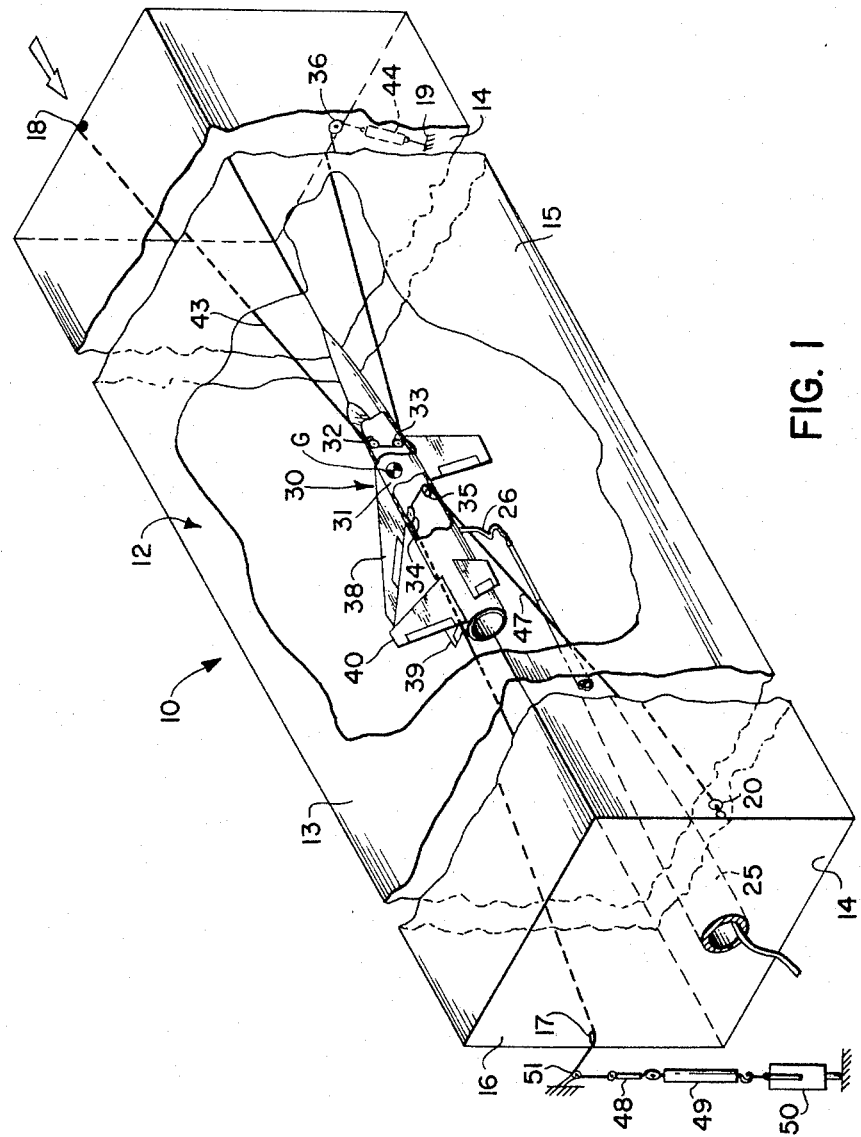
FIG. 1 is a perspective view of a segmented test section showing a test model mounted therein by the suspension system forming this invention.

Referring now more specifically to the details of the invention, FIG. 1 shows the free-flight suspension system, designated generally by the reference numeral 10, mounted in a test section 12. The test section 12 is of conventional design and of the type which might be associated with the various types of wind tunnels. Its configuration is generally that of a parallelepiped having a top and bottom 13 and 14 respectively and sides 15 and 16. The ends of the test section are open to allow air flow through the section. The arrow indicates the direction of flow through the test section.

Fixed to the top of the test section is anchor member 18. An anchor member 19 is located outside of and below the test section. These anchors are normally centered with respect to the test section and located well forward of the test model, usually, at least a test section width forward of the model. The purpose for the anchors 18 and 19 will be explained more fully hereinafter. A hook and eye arrangement 20 is fixed to the sidewall 15 well aft of the test model. A sheave 17 is mounted on the opposite side 16, both the sheave and the hook and eye normally being spaced equal distance between the width extremities of the sides. The purpose for these members will also be explained more fully subsequently.

A sting 25 of conventional design is located in the test chamber and is supported by fixed structure (not shown) in the usual manner. The sting 25 is utilized to support a flexible electrical conduit 26 which includes wiring for remotely controlling the model and conveying test results, the conduit 26 being connected with the test model.

The test model shown in FIG. 1 is designated generally by the reference numeral 30. This model is a supersonic aircraft; however, it is to be understood that within the modest aspect of the invention the test model may be any type of aircraft and/or spacecraft or missile.

The test model 30 has a body or fuselage 31 which is of supersonic design. The fuselage is cut away to reveal an upper vertical pulley 32 and lower vertical pulley 33. These pulleys are mounted on axles or spindles of conventional design supported by the model structure in a conventional manner. Bearings of the ball or roller type may be utilized with the pulley arrangements to reduce friction and provide easy turning of the pulleys. The pulley and bearing combination is designed to reduce friction between the cables and model to allow simulation of free-flight movement. The pulleys are mounted such that the outside diameters thereof are flush with the outer extremities of the body 31. The purpose of this is to reduce aerodynamic interference, particularly during transonic and supersonic test runs. This vertical pulley pair is mounted forward of the center of gravity of the test model and generally in the same plane as the vertical stabilizing surface of the model.

A horizontal pulley pair is mounted in the test model 30 at essentially the center of gravity of the model. This pair includes a left horizontal pulley 34 and a right horizontal pulley 35. Bearing structure and spindles are provided for the pulleys in a manner similar to the vertical pulley arrangement. The horizontal pulleys are also mounted flush with the extremities of the fuselage to reduce aerodynamic interference. Athough pulleys are shown as a means of accomplishing the invention, other antifriction arrangements as may be apparent to one skilled in the art are considered to be within the scope of the invention.

The test model 30 has a conventional supersonic wing structure 38 which contains control surfaces of known design such as ailerons. Also attached to the fuselage of the plane are horizontal control surfaces 39 and a vertical control surface 40. Each of the control surfaces may be provided with reversable electrical motors which are wired through the flexible electrical conduit 26. Command signals for the control surfaces may be given from a console (not shown) located outside of the test section.

A flexible wire 43 is tied to the anchor 18, entrained over the upper vertical pulley 32 and the lower vertical pulley 33. The wire continues on over sheave 36 and is connected to spring 44 both of which are located outside the test section area. The spring 44 is in turn connected to the anchor 19. In certain instances the spring 44 is omitted and the wire 43 connected directly to the anchor 19. If it is desirable to have the model free to translate longitudinally, the spring 44 is inserted in the wire 43 to provide for this freedom.

A flexible cable 47 is fixed to the hook and eye 20, and entrailed over right horizontal pulley 35 and left horizontal pulley 34. These pulleys are located on or behind the center of gravity G of the model. The cable 47 continues toward the aft portion of the test section 10 and engages the sheaves 17 and a sheave 51 carried by support structure outside the test section 10. The cable 47 terminates with a connection to a tension indicator gage 48. The gage 48 is joined to a soft spring 49 which is in turn connected to an actuator 50. The meaning of soft spring is that for a given incremental change in the length of the spring the tension in the cable and therefore the system is changed very little. The actuator 50 is fixed to wind tunnel support structure. The actuator 50 may be of the pneumatic, hydraulic or mechanical type and is utilized to load the spring 49 and thereby place the cable 47 under tension. The tension indicator gage 48 gives a reading as to the load placed on the spring by the actuator 50.

Figure 2:
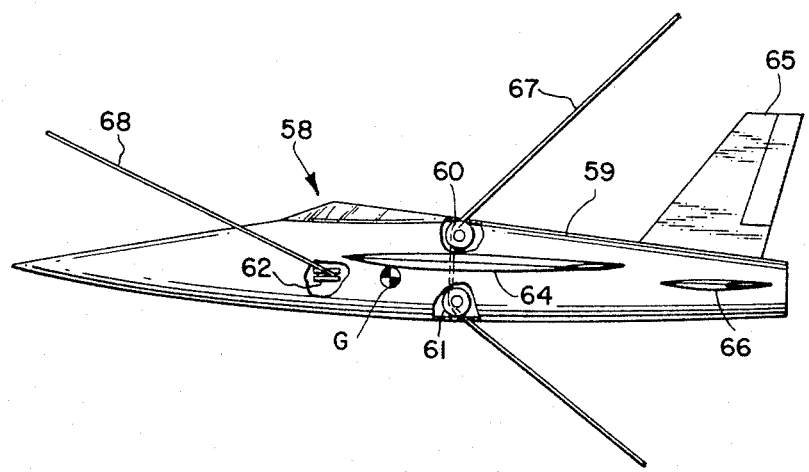
FIG. 2 is a side elevational view of a test model, partially cut away, to show the details of a portion of modified form of suspension system.
Figure 3:
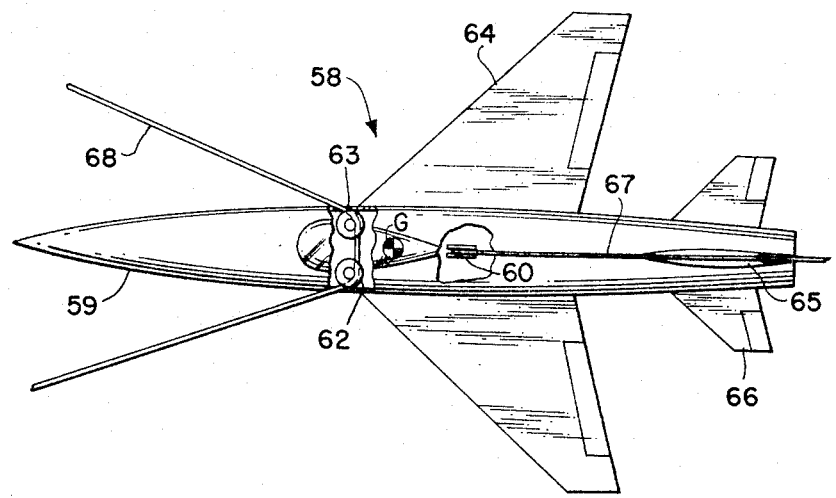
FIG. 3 is a plan view of the test model shown in FIG. 2, partially cut away to reveal components of the suspension system.

A modified form of the invention is shown in FIGS. 2 and 3 and is designated generally by the reference numeral 58. In this suspension arrangement, the vertical pulley pair is placed on or behind the center of gravity G of the test model and the horizontal pulley pair forward in the test model. The test model has a fuselage 59, wings 64, vertical stabilizing surfaces 65 and horizontal stabilizing surfaces 66. The fuselage 59 is partially cut away to show the pulley pairs, the vertical pulley pair including an upper pulley 60 and a lower pulley 61. The horizontal pulley pair includes a left pulley 62 and a right pulley 63. The pulleys are journaled in a manner similar to those in the suspension system 10. The pulley pairs are mounted flush with the fuselage of the test model to reduce aerodynamic interference. A flexible wire 68 is associated with the horizontal pulley pairs 62 and 63 and would be connected to the sides of the test section (not shown). A flexible cable 67 is associated with the vertical pulley pair 60 and 61 and would be connected to the top and bottom of the test section. In this arrangement, the tensioning means would be connected to the flexible cable 67 or if longitudinal translation of the model were desired, soft spring would also be connected in the flexible wire 68.

Figure 4:
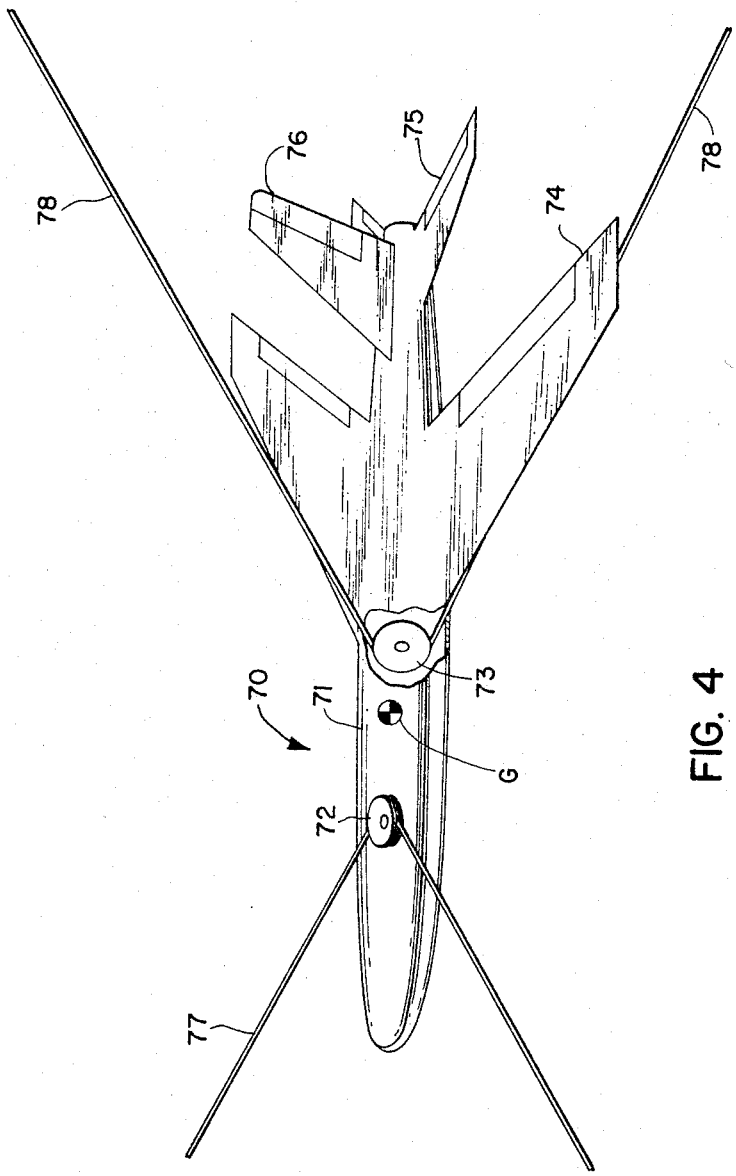
FIG. 4 is a perspective view, partially cut away, showing a modified form of the suspension system.

Another embodiment of the invention is shown in FIG. 4 and designated generally by the reference numeral 70. In this arrangement, the fuselage 71 of the test model is cut away to reveal a single, vertical pulley 73 and a horizontal pulley 72. These pulleys are journaled on bearings and a spindle supported in the test model structure. This embodiment of the invention illustrates that one or more pulley pairs, as well as additional pulleys or other antifriction devices, may be utilized and are considered within the scope of the invention. The test model has wings 74, horizontal stabilizing surfaces 75 and a vertical stabilizer 76. A flexible cable 78 is entrained over the vertical pulley 73 which is located on or behind the center of gravity of the test model. As in the previous embodiments, the cable associated with the vertical pulley arrangement is connected to the top and bottom of the test section, the flexible wire 77 engaging the horizontal pulley 72 being connected to the sides of the test section and forward of the center of gravity G of the test model. Mechanism for tensioning the wire and cable may be utilized as in the previous embodiments.

*Operation*

When a wind tunnel test is to be made of a test model, the model is suspended in the test chamber similar to the manner shown in FIG. 1. The particular manner of fixing the wire and cable to the test section may be reversed depending upon whether or not the vertical pulley pair or single pulley is at the forward or rearward location on the test model, the horizontal pulley mechanism being oppositely disposed.

The frequency and stability characteristics of the system are governed primarily by the amount of tension on the cable 47 in the system 10 and the distance between the front and the rear of the pulley pairs. The amount of tension applied or desired for the particular test run is readily indicated by the gage 48. Thus, it is a simple matter to energize the actuator 50 which will load spring 49 to the degree necessary as shown on the gage 48. Obviously, the desired tension depends on the model configurations under test; however, in general, the tension should be high enough to stabilize the system, but low enough to keep the natural frequencies of the mount well below the rigid body frequencies of the model in free-flight. If used, spring 44 in the front wire 43 functions primarily for the purpose of allowing a longitudinal translation of the test model. It is to be understood, however, that the mechanism for placing the suspension system under tension may be associated with the front wire as well as with the rear cable.

The electrical conduit 26 is connected to the test model, the various wires contained therein being joined to the mechanism being utilized to operate and control surfaces and convey test results. The conduit 26 is otherwise connected to a control box or console outside the test section.

In operation, the airstream passes through the test section 12 in the direction of the arrow as indicated in FIG. 1. As the airstream flows through the wind tunnel, the various controls may be manipulated to simulate free-flight conditions. In the pitching and vertical translation movements, the test model moves about the vertical pulley pair, pulleys 32 and 33, as shown in FIG. 1. In the yawing and lateral translation movements, the model moves above the horizontal pulley pairs 34 and 35 as shown in FIG. 1. In the movement of roll the pulley pairs may move only slightly. This movement is made possible by the flexibility in the wire and cable which allows the test model to operate somewhat as a pendulum. If longitudinal translation is to take place, the spring 44 is tied in with the wire 43, and takes up any slack in the wire as the test model moves forward as does the rear spring 49 when the model moves aft.

The suspension arrangement allows the test model to have a large amplitude of motion. It should also be pointed out that if it appears the model is out of control and will possibly collide with the walls of the test section, the actuator 50 can be utilized to increase the tension on the cable 47 and thereby right the test model avoiding expensive damage. Also, should it be necessary in order to scale gravity forces, the front cable ends can be oriented at unequal angles relative to the center line of the test section so as to produce an approximately constant vertical force on the model. Obviously, the model can be provided with various test probes the information from which can be carried out through the electrical conduit 26.

From the above description, it can be seen that free-flight suspension system herein disclosed will allow simulated flights up to six degrees of freedom of rigid-body motion. The system can be constructed from readily available items as cables, pulleys, etc. A single operator can fly the model by means of pitch and roll trim controls. The system has negligible inertia, the effect of mass of the supporting cables in general being small compared with the mass of the model. The small aerodynamic interference caused by the cables and pulleys permits use of the system at transonic and supersonic test velocities. The suspension system has performed successfully over a broad range of test conditions and with various model configurations. Test experience has been obtained at Mach numbers up to 1.2 and at dynamic pressures of up to 300 pounds per square foot. The frequency and stability of the test model can be controlled by the tension apparatus. Simulation of steady maneuver accelerations and/or Froud number may be obtained by the combined effects of the cable wire geometry and applied tension. Aerodynamic stability derivatives can be deduced from response of the model to external force inputs. Obviously, the system is economical to construct and with its few component parts is also economical to maintain.

What is claimed as new and desired to be secured by Letters Patent of the United States is:

1. A free-flight suspension system comprising: a wind tunnel test section or the like; a model to be suspended in said test section; first pulley means carried by said model; second pulley means carried by said model; first cable means associated with one of said pulley means and being attached to the top and bottom of said test section; second cable means associated with the other of said pulley means and being attached to the respective sides of said test section means; and control means for flying said model to simulate flight conditions.

2. A free-flight suspension system as in claim 1 wherein one of said cable means includes tensioning means attached thereto for stabilizing said system.

3. A free-flight suspension system as in claim 1 wherein said cables are attached to the test section at least one test section width forward and aft of the model.

4. A free-flight suspension system as in claim 4 wherein said cables are oriented at unequal angles relative to the center of the test section.

5. A free-flight suspension system comprising: a wind tunnel test section or the like; a model to be supported in said test section; first antifriction means carried by said model; a wire engaged with said antifriction means and connected to said test section; second antifriction means carried by said model; and a cable engaged with said second antifriction means and connected to said test section said wire, cable and antifriction means being so constructed and arranged as to allow at least five degrees freedom of movement of sid model.

6. A free-flight suspension system as in claim 5 wherein tension means is associated respectively with said wire and said cable to provide at least six degrees freedom of motion of said model.

7. A free-flight suspension system as in claim 5 wherein said first and second antifriction means is pulley structure.

8. A free-flight suspension system as in claim 5 wherein said first antifriction means and the wire associated therewith are at an angle substantially normal to the second antifriction means and the cable associated therewith.

9. A free-flight suspension system as in claim 5 wherein said cable means has tensioning means attached thereto; and means for varying the tension of the tensioning means to stabilize the system.

10. A free-flight suspension system as in claim 5 wherein said first and second antifriction means are pulley pairs, said pulley pairs being mounted at an angle substantially normal to each other.

11. A free-flight suspension system comprising: a wind tunnel test section or the like; a model to be suspended in said test section; said model having a first pair of pulleys positioned forward of the center of gravity of said model; a wire fixed to the top and bottom of said test section forward of said model and being entrained over said pair of pulleys; said model having a second pair of pulleys located substantially on or behind the center of gravity of said model; a cable fixed to the respective sides of said test section aft of said model and entrained over said second pair of pulleys; and tensioning means attached to said cable to provide stability for said system.

12. A free-flight suspension system as in claim 11 wherein said tensioning means includes a spring; and actuator means connected to said spring to load said spring.

13. A free-flight suspension system as in claim 11 wherein tension means is connected to said wire.

14. A free-flight suspension system as in claim 11 wherein said first pulley pair is mounted in substantially a vertical plane in said model, said second pulley pair being mounted in substantially a horizontal plane in said model; and the extremities of said pulley pairs being flush with the outer surface of said model.

15. A free-flight suspension system as in claim 11 wherein said first pulley pair is mounted in substantially a vertical plane in said model; said second pulley pair being mounted in a substantially horizontal plane in said model; and tension means including a spring; and actuator means connected to said spring to load said spring.

16. A free-flight suspension system comprising: a wind tunnel test chamber or the like; a test model to be supported in said test chamber and having horizontal and vertical stabilizing surfaces; pulley means mounted in said test model in a plane substantially parallel to said horizontal stabilizing surface; pulley means mounted in said test model and being aligned with said vertical stabilizing surface; and suspension means associated with said pulley means and connected to said test chamber to allow at least five degrees freedom of movement of said test model.

17. A free-flight suspension system as in claim 16 wherein said pulley means in each instance is a single pulley.

18. A free-flight suspension system as in claim 16 wherein said pulley means in each instance is at least a pair of spaced pulleys.

19. A free-flight suspension system comprising: a wind tunnel test section or the like; a model to be suspended in said test section; said model having a first pair of pulleys positioned forward of the center of gravity of said model; a wire fixed to the respective sides of said test section forward of said model and being entrained over said pair of pulleys; said model having a second pair of pulleys located at substantially the center of gravity of said model; a cable fixed to the top and bottom of said test section aft of said model and entrained over said second pair of pulleys; and tensioning means attached to said cable to provide stability for said systems.

20. A free-flight suspension system as in claim 19 wherein said first pulley pair is mounted in substantially a horizontal plane in said model, said second pulley pair being mounted in substantially a vertical plane in said model; and the extremities of said pulley pairs being flush with the outer surface of said model.

References Cited by the Examiner
UNITED STATES PATENTS

| | | | |
|---|---|---|---|
| 1,682,138 | 8/1928 | Merrill | 73—147 |
| 1,947,962 | 2/1934 | Alfaro. | |
| 2,849,833 | 9/1958 | Mills | 46—77 |

DAVID SCHONBERG, *Primary Examiner.*